UNITED STATES PATENT OFFICE.

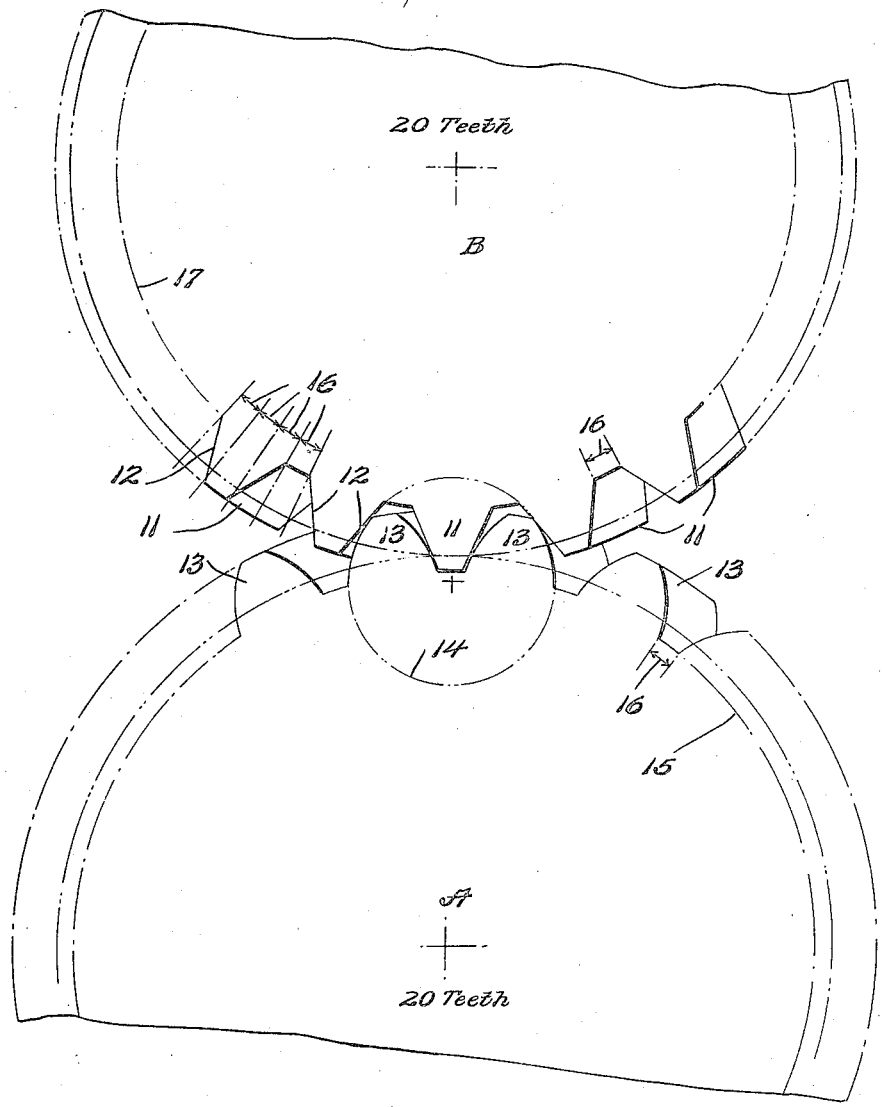

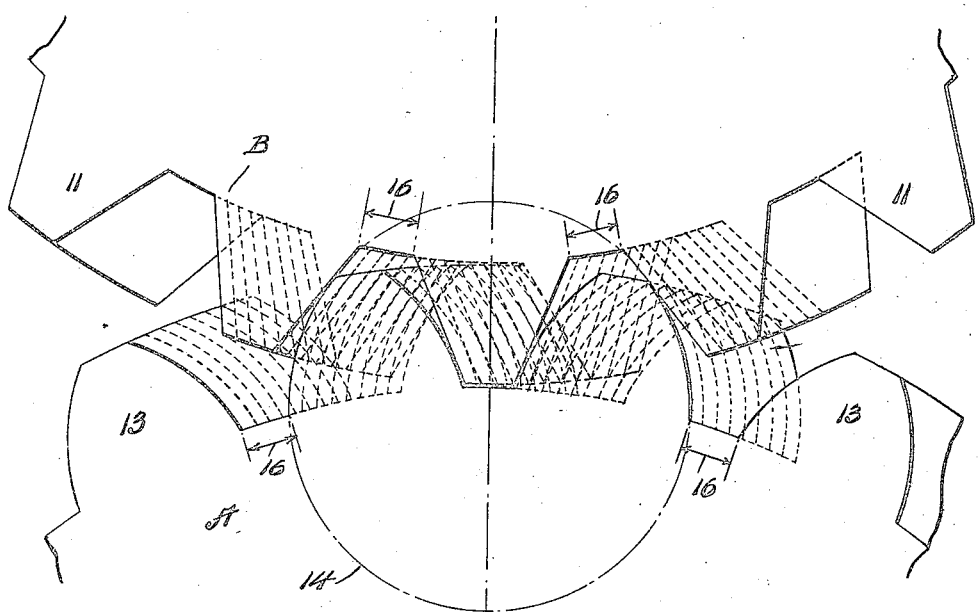
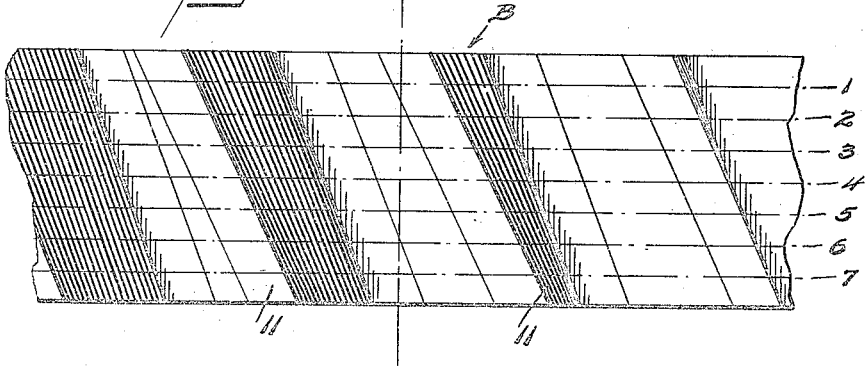

HENRY J. SCHMICK, OF WILLIAMSPORT, PENNSYLVANIA.

TOOTHED GEARING.

1,425,144.     Specification of Letters Patent.     Patented Aug. 8, 1922.

Application filed June 30, 1921. Serial No. 481,561.

*To all whom it may concern:*

Be it known that I, HENRY J. SCHMICK, a citizen of the United States, residing at Williamsport, Pennsylvania (whose post office address is 636 West Third Street, Williamsport, Pennsylvania), have invented an Improvement in Toothed Gearing, of which the following description, in connection with the accompanying drawings, is a specification, like characters on the drawings representing like parts.

This invention relates to the shape and arrangement of the working faces of intermeshing teeth for spur gears, bevel gears, spiral gears and other forms of gearing for connecting rotating or oscillating bodies.

The objects of the invention are to improve the working qualities and to simplify the construction of gear teeth and gears, and to increase the strength thereof and the amount of power that can be transmitted thereby.

Further objects and advantages of the invention appear hereinafter in connection with the following description of the embodiment of the invention shown in the drawings.

In the drawings, which illustrate a preferred but not the only form of the invention, Fig. 1 is a side elevation of two mating gears, showing the outline of the teeth on both sides and their relative positions;

Fig. 2 is a diagram illustrating the intermeshing of the teeth at various angular positions; and Fig. 3 is an edge view of a portion of one of the gears shown in Figs. 1 and 2, supplementing the diagram.

It is usual to make gears with teeth conforming in outline to an epicycloidal or involute curve. These gears are difficult to make and require special tools and cutters for shaping them.

My invention substitutes simple forms of cutters having straight sides for the series of cutters of curved outline usually required for making gears heretofore.

Referring to Fig. 1 of the drawings, the gears A and B therein shown have twenty teeth each spaced uniformly around their circumferences. The gear B has a slightly smaller outside diameter than the gear A and its teeth 11 have straight sides 12. The sides of the teeth 13 of the gear A are curved to arcs of circles having their centers half way between the center lines of the successive pairs of teeth, as indicated by the circle 14 in Fig. 1. The centers of the arcs are on or just inside of the circle 15 through the bases of the teeth 13.

The bottom spaces 16 between adjacent teeth 11 and 13 are the same as the width of the extremities of the teeth 11; and the width of the extremities of the teeth 13 is slightly less. The width of the bottom spaces 16 is about one quarter (or slightly less) of the circular pitch of the teeth, measured on the circle 17 through the bottom of the teeth 11, as shown in Fig. 1.

The teeth may be skewed or twisted as shown in Fig. 3, in which case the two opposite ends of each tooth are preferably spaced angularly one half the center distance between adjacent teeth so that the end of every tooth on either side of the gear falls exactly opposite the space between it and the next tooth on the opposite side of the gear.

In Fig. 2 the dotted lines indicate the intersections, with the faces of the straight and curved teeth, respectively, of straight planes perpendicular to the axes of the gears on the dot and dash lines 1, 2, 3, 4, 5, 6 and 7 in Fig. 3.

It is evident that the teeth may be cut by straight or circular sided cutters caused to cut in straight lines across the width of the gear, as described in my pending application, Serial No. 266,139, filed December 10, 1918.

The number of teeth and dimensions of the gears may be varied considerably so long as the slope of the sides of the straight teeth and the radius of the circles forming the curved teeth are so chosen as to avoid interference between successive teeth. The invention is not restricted to the numbers of teeth and sizes and proportions shown in the drawings.

I claim the following as my invention:

1. A gear having each pair of adjacent teeth formed with working surfaces on their opposite faces conforming to arcs of circles with their centers on lines bisecting the spaces between said teeth.

2. A gear having each pair of adjacent teeth formed with working surfaces on their opposite faces conforming to arcs of circles of a radius less than the center distance between said teeth and with their centers on lines bisecting the spaces between said teeth.

3. A gear having twisted teeth, each pair of adjacent teeth being formed with working surfaces on their opposite faces conforming to arcs of circles with their centers concentric with the axis of said gear along curved lines bisecting the spaces between said teeth.

4. A gear having each pair of adjacent teeth formed with working surfaces on their opposite faces conforming to arcs of circles with their centers spaced around the axis of said gear in a circle of approximately the diameter of the bottoms of said teeth on lines bisecting the spaces between said teeth.

5. A gear having each pair of adjacent teeth formed with working surfaces on their opposite faces conforming to arcs of circles with their centers on lines bisecting the spaces between said teeth, in combination with a mating gear having teeth with straight side faces forming working surfaces engaging said curved tooth faces.

6. A gear having each pair of adjacent teeth formed with working surfaces on their opposite faces conforming to arcs of circles with their centers on lines bisecting the spaces between said teeth, in combination with a mating gear having teeth with straight side faces forming working surfaces engaging said curved tooth faces, the diameter of said straight tooth gear being less than that of a curved tooth gear of the same number of teeth.

7. A gear having each pair of adjacent teeth formed with working surfaces on their opposite faces conforming to arcs of circles with their centers on lines bisecting the spaces between said teeth, in combination with a mating gear having teeth with oppositely inclined straight sides, the spaces across the tops and bottoms of said teeth being approximately one fourth of the circular pitch of said straight toothed gear at the bottoms of the teeth.

8. The combination of a gear having circular sided teeth 13 and a gear of slightly less diameter having an equal number of straight sided teeth 11, substantially as described.

In testimony whereof, I have signed my name to this specification.

HENRY J. SCHMICK.